(12) United States Patent
Agnew et al.

(10) Patent No.: US 6,269,921 B1
(45) Date of Patent: Aug. 7, 2001

(54) ONE-TIME BLEED VALVE WITH RESET CAPABILITY FOR ANTI-LOCK BRAKE HYDRAULIC CONTROL UNIT AND A BRAKE SYSTEM USING SAME

(75) Inventors: David L. Agnew, Clarkston; Dalibor Zaviska, Rochester, both of MI (US)

(73) Assignee: Continental Teves, Inc., Auburn Hills, MI (US)

( * ) Notice: Subject to any disclaimer, the term of this patent is extended or adjusted under 35 U.S.C. 154(b) by 0 days.

(21) Appl. No.: 09/211,094

(22) Filed: Dec. 14, 1998

(51) Int. Cl.$^7$ ....................................... B60T 11/30
(52) U.S. Cl. .................... 188/352; 303/119.1; 303/113.1
(58) Field of Search ................... 188/352; 303/113.1, 303/119.1, 119.2, 119.3, DIG. 10

(56) References Cited

U.S. PATENT DOCUMENTS

| | | | |
|---|---|---|---|
| 4,702,532 | * 10/1987 | Anderson | 303/115 |
| 4,902,077 | * 2/1990 | Belart et al. | 303/113 |
| 5,036,666 | * 8/1991 | Vasselet | 60/584 |
| 5,324,101 | 6/1994 | Kehl et al. . | |
| 5,505,529 | 4/1996 | Siegel et al. . | |
| 5,540,487 | 7/1996 | Beck et al. . | |
| 5,605,384 | * 2/1997 | Johnston et al. | 303/113.1 |
| 5,628,550 | 5/1997 | Zaviska et al. . | |
| 5,666,991 | 9/1997 | Hartig . | |
| 5,788,344 | 8/1998 | Friedow et al. . | |
| 5,947,239 | * 9/1999 | Koelzer | 188/352 |

* cited by examiner

Primary Examiner—Robert J. Oberleitner
Assistant Examiner—Bradley King
(74) Attorney, Agent, or Firm—Rader, Fishman & Grauer PLLC

(57) ABSTRACT

A one-time bleed valve with reset capability for an anti-lock hydraulic control unit comprises a piston adapted to be sealingly installed in a bore made in a body of the hydraulic control unit in response to a brake pressure. The bore is located in a portion of the body that is immediately under a recessed part of the body that accommodates a normally open electromagnet valve. On its one end, the bore is in communication with a primary hydraulic pressure circuit, whereas on another its end it is connected with a low-pressure line. Owing to such a structure, when the piston sits loosely in the bore, an air communication is established between the primary hydraulic pressure circuit and the low-pressure line, and air can evacuate from the low-pressure brake circuit on exposure to a vacuum applied to the primary hydraulic pressure circuit. To provide the bleed valve with a reset capability, an access hole is made between outside of the body and the bore.

Also disclosed is a hydraulic brake system for vehicle wheels that employs bleed valves of the above-described structure.

8 Claims, 3 Drawing Sheets

ONE-TIME BLEED VALVE WITH RESET CAPABILITY FOR ANTI-LOCK BRAKE HYDRAULIC CONTROL UNIT AND A BRAKE SYSTEM USING SAME

BACKGROUND OF THE INVENTION

1. Field of the Invention

The present invention relates to motor vehicles, more particularly to those of them enjoying anti-lock brake system (ABS) and/or traction control system (ASR, for anti-slip regulation), and still more particularly to a bleed valve in a hydraulic control unit of such a system.

2. Description of the Related Art

ABS (and ASR) is a part of the standard equipment in medium-class and upper-class vehicles. These systems are becoming increasingly included in lower-category and low-cost cars.

ABS and their variations typically comprise a hydraulic control unit (HCU) that houses hydraulic components of the system. The HCU is connected to the vehicle brake system between its master cylinder and calipers of wheel brakes.

A conventional hydraulic brake system, a one-wheel circuit 10 of which is shown in FIG. 1, comprises a tandem master cylinder (TMC) common for all wheels (shown is an inlet 12 from TMC), a HCU 14, and a wheel caliper (shown in FIG. 1 is an outlet 16 to the wheel caliper). Depicted within dotted lines is a low-pressure portion 18 of the HCU 14. The portion 18 typically contains a low-pressure accumulator 20, an input portion 22 of a return pump 24, and associated lines 26 and 28. A motor 30 drives the return pump 24. Depicted in FIG. 1 are also a return pump outlet valve 32, a noise damper 34, and two electromagnet valves: a pressure buildup normally open (NO) valve 36 and a pressure reduction normally closed (NC) valve 38. The pressure buildup electromagnet NO valve 36 is disposed in a brake line 40 connecting the inlet 12 from TMC to the outlet 16. A check valve 42 is connected in parallel to the NO valve 36. The pressure reduction electromagnet NC valve 38 is placed in a return line 44 that eventually, through the return pump 24 reunites with a main brake line 46.

Prior to filling the system including the circuit 10 with brake fluid, a vacuum is applied at the TMC to remove air from the system. When the vacuum is applied to the HCU, a portion of the unit, namely the low-pressure circuit, is isolated and does not evacuate its air. Any air bubbles still present in the hydraulic medium may bring about such an elasticity of fluid columns formed by the medium that the brake pressures required in wheel brake cylinders are not brought about to the requisite level.

ABS/ASR brake systems have several NC electromagnet valves; the valves of return pumps used in these brake systems are normally closed as well. The problem therefore exists that pockets of air may be present downstream of the NC electromagnet valves, and also downstream of the return pump valves. The air in these pockets may possibly be removed only with difficulty using liquid.

It has been proposed that at least the NC valves be triggered electrically upon evacuation and prior to filling of the system, and thus opened. To do so, special plug connections must be used to supply current to these electromagnet valves. The connections of this kind are expensive and involve operating costs when used, let alone that they are also complicated to manufacture. For many applications, therefore, it is the customer's desire not to energize the NC valves during the evacuation/filling process because of those issues involved.

Alternatively, in order to evacuate the low-pressure circuit, a check valve must be installed between the low-pressure circuit and the main circuit. The check valve must be set to a low delta-pressure value for good evacuation, but this can lead to unwanted movement of the valve during normal braking and ultimately to the loss of brake performance.

The reason for that to occur lies in that when the pedal is allowed to return rapidly, normal braking can create a transient partial vacuum in the brake system. The vacuum forms in the brake system when the momentum of the fluid tends to push into the master cylinder when the pedal abruptly stops. The transient vacuum at the HCU can open the check valve, allowing the partial vacuum to become trapped in the low-pressure circuit. Over time, the trapped vacuum tends to pull ambient air into the low-pressure circuit of the HCU. When the HCU subsequently goes into an ABS mode, the trapped air can be pumped into the brake circuit causing reduced brake performance.

Accordingly, a need exists in the art to provide a check valve for evacuating the low-pressure circuit without energizing the NC valves and also without subsequent movement during normal braking.

SUMMARY OF THE INVENTION

Therefore, a primary object of the present invention is to provide a hydraulic brake system that would retain all the advantages of the systems in the art, not being subject to their drawbacks discussed in the above.

Another object of the present invention is to provide a hydraulic brake system comprising a check valve for evacuating the low-pressure circuit without energizing the NC valves and also without subsequent movement during normal braking.

These and other objects are attained in the present invention that provides a one-time bleed valve with reset capability for an anti-lock hydraulic control unit. The unit has a body accommodating a low-pressure line and a primary hydraulic pressure circuit connecting a tandem master cylinder to a wheel brake caliper via a normally open electromagnet valve mounted in a recessed part of said body. The bleed valve comprises a piston that can be sealingly installed into a bore made in the body of the hydraulic control unit. The bore is sized to create a seal when the piston is pushed into the bore in response to a brake pressure. The bore is in communication on its one end with the primary hydraulic pressure circuit and on another its end with the low-pressure line. Owing to such a structure of the bleed valve, when the piston sits loosely in the bore, an air communication is established between the primary hydraulic pressure circuit and the low-pressure line. Due to that communication, air can be evacuated from the low-pressure brake circuit when it is exposed to a vacuum applied to the primary hydraulic pressure circuit.

The piston may further comprise an O-ring fitted on an annular groove made on a head portion of the piston.

To facilitate pushing the piston into the bore, the bore is made with a lead-in chamfer.

To limit a travel distance of the piston, the bore is located in a portion of the body that is immediately under the recessed part of the body that accommodates the normally open electromagnet valve.

To provide the bleed valve with a reset capability, an access hole is made between outside of the body and the bore, the hole having an expansion in an area thereof adjoining the outside, the expansion accommodating a seal ball.

Also claimed according to the present invention is a hydraulic brake system for vehicle wheels in a multiple-brake-circuit design. The system comprises a master brake cylinder, hydraulic control unit, wheel brakes and a plurality of brake circuits. Each circuit of this plurality comprises a primary hydraulic pressure circuit and a secondary hydraulic pressure circuit. The primary hydraulic pressure circuit connects the master cylinder with at least one wheel brake for applying hydraulic pressure thereto via a normally open electromagnet valve in the hydraulic control unit. The secondary hydraulic pressure circuit that returns hydraulic pressure from the wheel brake to the master cylinder via a normally closed electromagnet valve in the hydraulic control unit comprises a low-pressure line. The hydraulic control unit includes a body accommodating the primary hydraulic pressure circuit, the normally open electromagnet valve, and the low-pressure line. Each circuit of the plurality of brake circuit also comprises a bleed valve to connect the primary hydraulic pressure circuit and the low-pressure line together. The bleed valve comprises a piston adapted to be sealingly installed into a bore made in the body of the hydraulic control unit, the bore being sized to create a seal when the piston is pushed into the bore in response to a brake pressure. On its one end, the bore is in communication with the primary hydraulic pressure circuit, whereas on another end it is in communication with the low-pressure line. As a result, when the piston sits loosely in the bore, an air communication is established between the primary hydraulic pressure circuit and the low-pressure line to facilitate air evacuation from the low-pressure line upon exposure of the system to a vacuum applied to the primary hydraulic pressure circuit.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
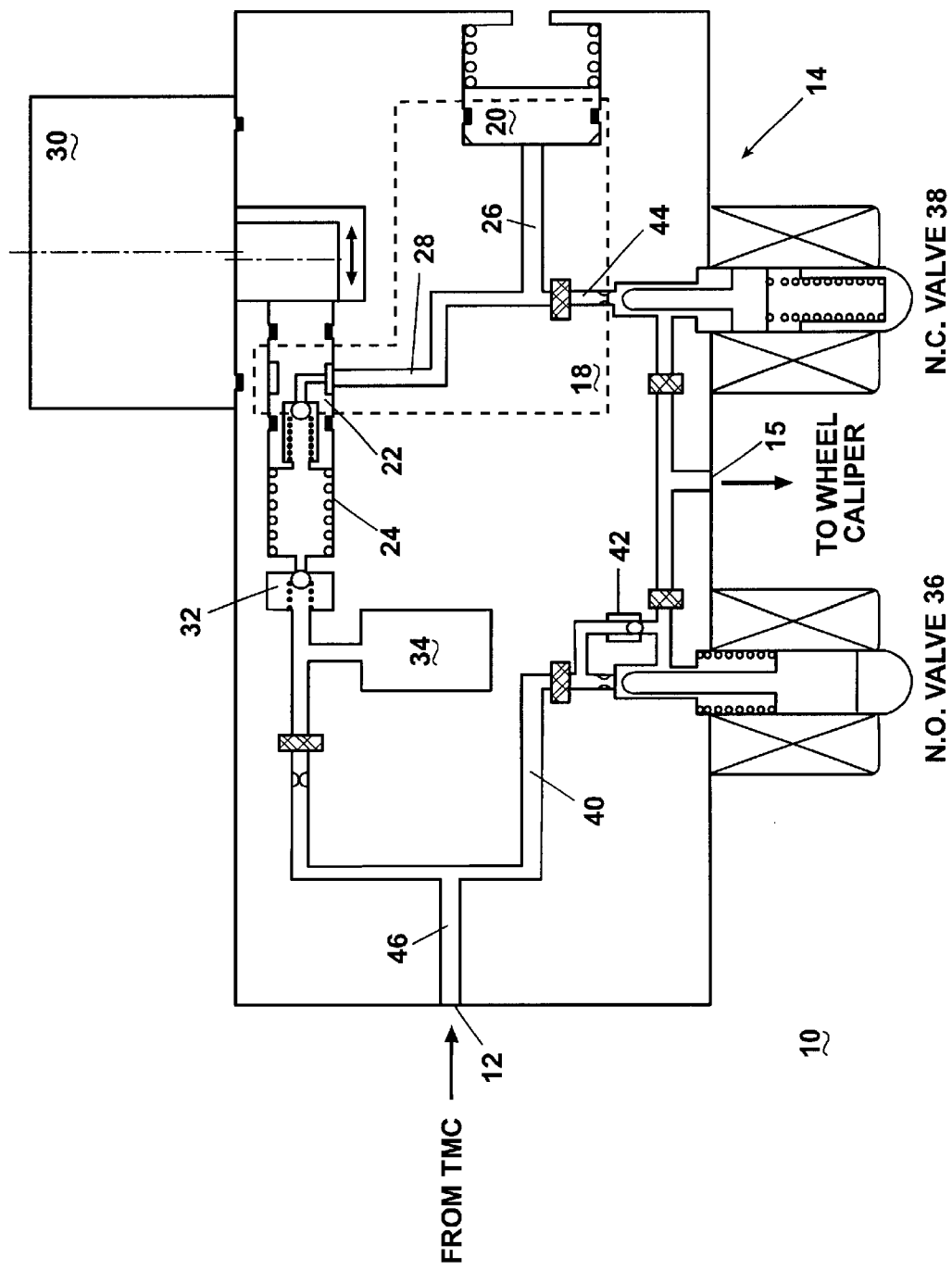
FIG. 1 shows a schematic diagram of a hydraulic brake system illustrating the area of application of the present invention.
Figure 2:
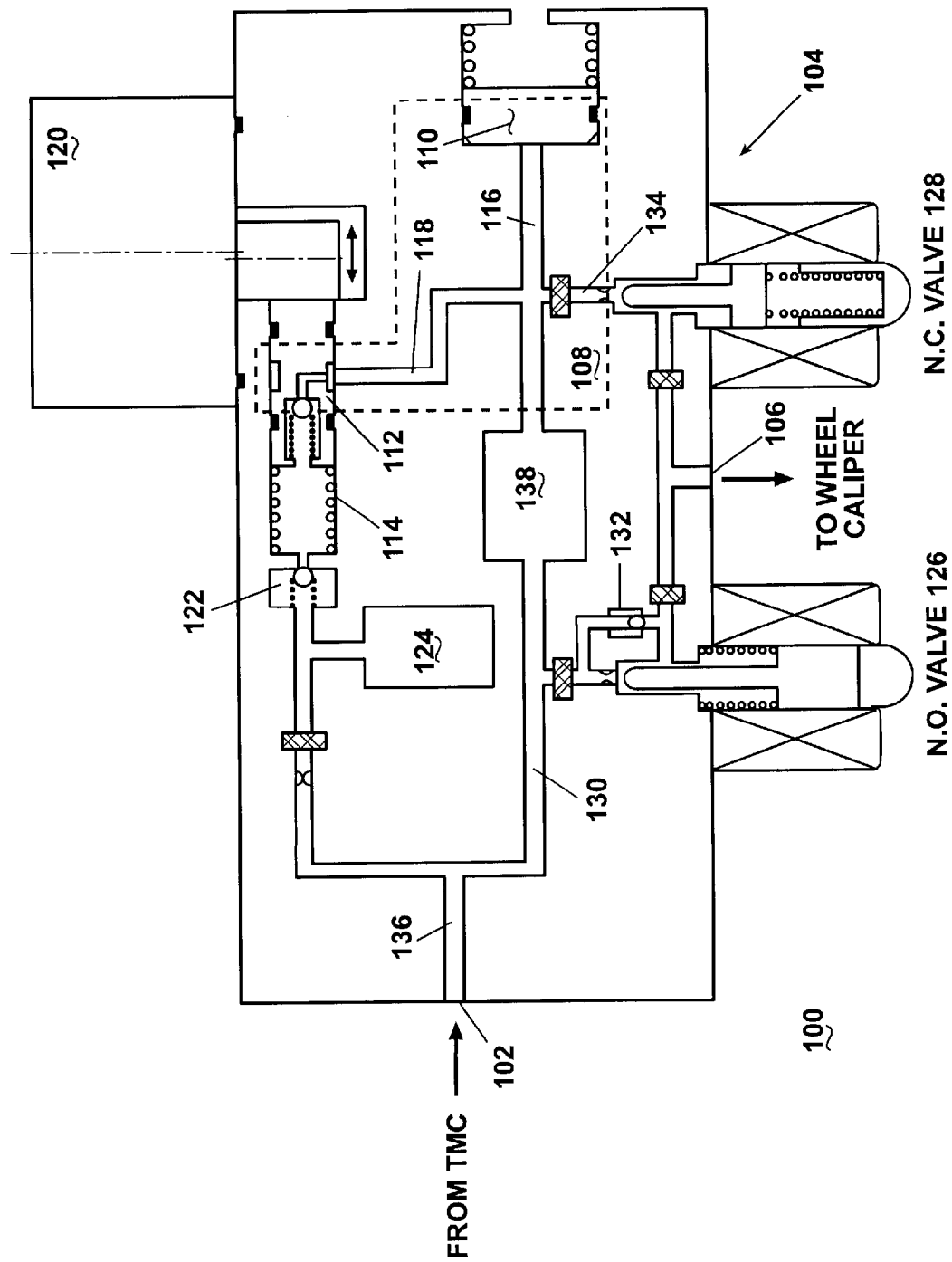
FIG. 2 is a schematic diagram of a hydraulic brake system according to the present invention.

Referring now to FIG. 2 where a schematic diagram of a hydraulic brake system 100 according to the present invention is shown, the system 100 comprises all the principle components of the conventional system 10 depicted in FIG. 1. Specifically, it has a TMC supplying brake fluid to all wheels, the TMC being represented in FIG. 2 by an inlet 102; a HCU 104; and a wheel caliper defined in FIG. 2 by an outlet 106 thereto.

A low-pressure portion 108 of the HCU 104 is shown within a dotted contour. It contains a low-pressure accumulator 110, an input portion 112 of a return pump 114, and associated low-pressure lines 116 and 118. A motor 120 drives the return pump 114. Illustrated in FIG. 2 are also a return pump outlet valve 122, a noise damper 124, and two electromagnet valves: a pressure buildup NO valve 126 and a pressure reduction NC valve 128. The pressure buildup electromagnet NO valve 126 is disposed in a brake line 130 connecting the inlet 102 from TMC to the outlet 106. A check valve 132 is also connected in parallel to the NO valve 126. The pressure reduction electromagnet NC valve 128 is placed in a return line 134 that eventually, through the return pump 114 reunites with a primary hydraulic pressure circuit 136.

Figure 3:
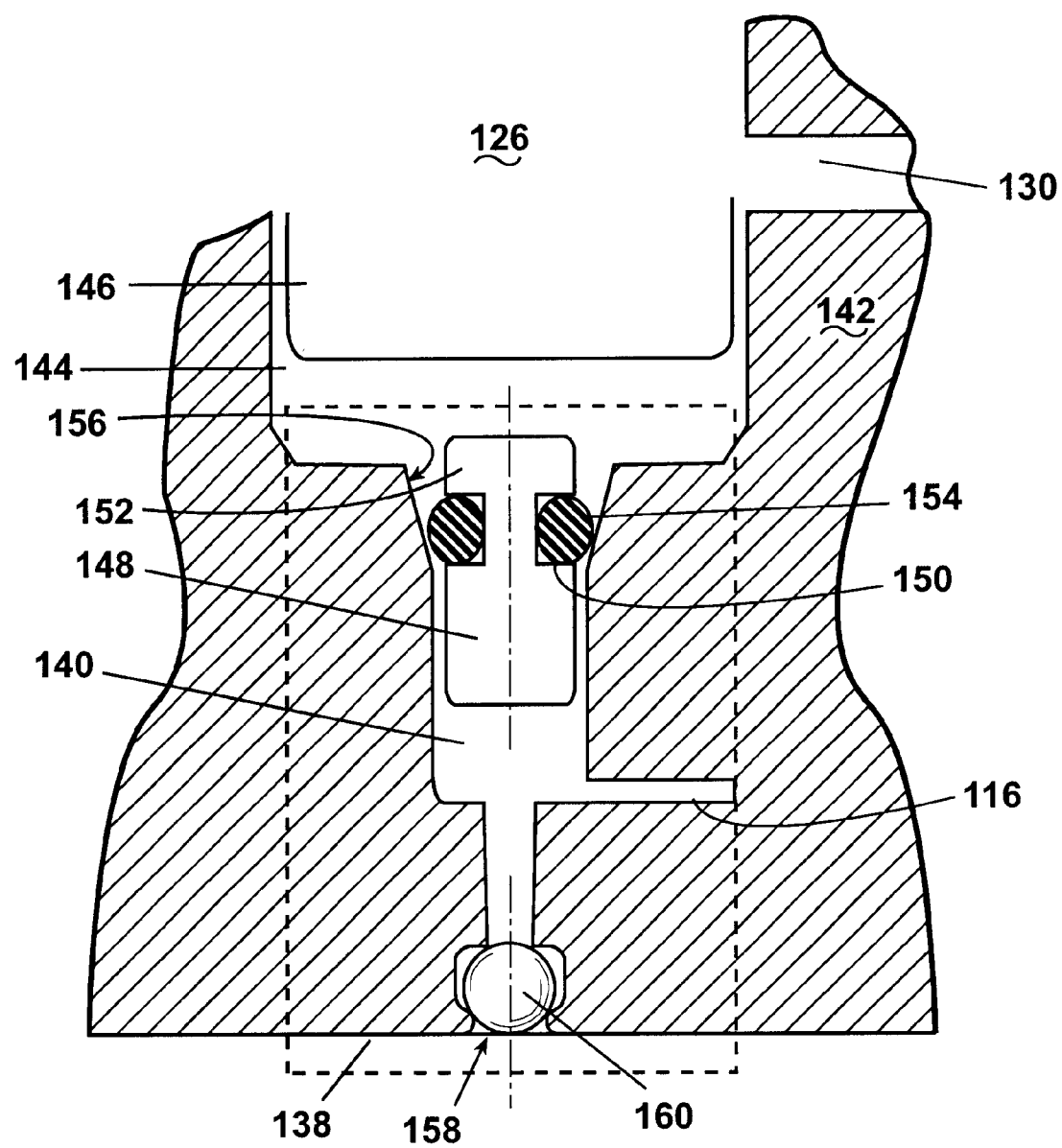
FIG. 3 illustrates a one-time bleed valve according to the present invention.

In addition, the system 100 comprises a one-time bleed valve 138 connected between the low-pressure line 116 and the main brake line 136. Shown in FIG. 3, the bleed valve 138 is structurally assembled in a bore 140 made in a body 142 of the HCU 104. The bore 140 is arranged in the body 142 in such a way that on one of its ends it is connected to the line 130 of the TMC primary hydraulic pressure circuit 136, and on another of its ends it is connected to the low-pressure line 116. To obtain an easy access from the bore 140 to the line 130, it was found convenient to make the bore 140 at a recessed part 144 of the body 142 that accommodates the NO valve 126, and more specifically, immediately below the body 146 of the valve 126. The valve 138 comprises a piston 148 with an annual groove 150 made on a head portion 152 of the piston 148, and an O-ring 154 assembled in the groove 150. The diameter of the bore 140 is sized to create a seal when the piston 148/O-ring 154 combination is pushed downward into the bore 140. The bore 140 is provided with a lead-in chamfer 156 to facilitate the piston/O-ring combination to be pushed into the bore.

Provided as an auxiliary feature of the bleed valve 148 is an access hole 158 to reset the valve 138 after a leak test. The feature will be discussed below in more detail. The access hole 158 can be sealed with a ball 160.

The piston 148 is initially assembled loosely into the bore 140 so that it rests in the lead-in chamfer 156. The body 146 of the NO valve 126 limits from above the piston's travel to allow only a predetermined amount of stroke when operating.

At the rest condition, the piston 148 is loosely set into the bore 140 so that it rests on the lead-in chamfer 156. If an air-leak test is conducted on the HCU 104 prior to shipment of the system 100 to an OEM, high pressure is applied to the main circuit, that is to primary hydraulic pressure circuit 136, the low-pressure circuit remaining at the atmospheric pressure. The pressure difference will force the piston 148 into the bore 140, thus sealing the path between the lines 130 and 116. After the test is completed, a rod (not shown) is inserted in the access hole 158 to push the piston back out of the bore 140 resetting it for the evacuation process. The feature of accessing the piston 148 through the hole 158 is not needed if the air-leak pretest is not required.

After the HCU 104 is installed into a vehicle, the evacuation process applies a vacuum to the main circuit 136 (and hence to the line 130). The valve 138 is forced open due to the atmospheric pressure in the low-pressure line 116, thus allowing the air to be evacuated. When brake fluid is inserted into the system at low pressure, the valve 138 will close again.

When brake pressure is applied at the proof pressure load during a test on a vehicle assembly line, a large pressure drop will ensure that the piston 148 will move completely into the bore 140. During normal brake operation, the piston 148 seals the line 130 from the low-pressure line 116. When a transient vacuum is applied due to brake pedal release, friction of the O-ring 154 holds the valve 138 in place. Also, an undercut (not shown) may be used in the bore 140 to further prevent the valve 138 from moving backward after it has been seated.

While the foregoing description relates to preferred exemplary embodiments of the present invention, it is to be understood that these embodiments are given by example only and not in a limiting sense. Those skilled in the art may make various modifications and additions to the preferred embodiments chosen to illustrate the invention without departing from the spirit and scope of the present contribution to the art. Accordingly, it is to be realized that the patent protection sought and to be afforded hereby shall be deemed to extend to the subject matter claimed and all equivalence thereof fairly within the scope of the invention.

What is claimed is:

1. A one-time bleed valve assembly system for an anti-lock brake system, comprising:

hydraulic control unit having a body accommodating a low-pressure line and a primary hydraulic pressure circuit connecting a tandem master cylinder to a wheel brake caliper by way of a normally open electromagnet valve mounted in a recessed part of said body, wherein said bleed valve includes a piston adapted to be sealingly installed into a bore made in said body, wherein said bore is sized to create a seal when said piston is pushed into said bore in response to a brake pressure, wherein said bore is in communication on one end thereof with said primary hydraulic pressure circuit and in communication on another end thereof with said low-pressure line, whereby when said piston sits loosely in said bore, an air communication is established between said primary hydraulic pressure circuit and said low-pressure line thus allowing air evacuation from said low-pressure line on exposure to a vacuum applied to said primary hydraulic pressure circuit wherein said bore is made in a portion of said body located immediately under said recessed part accommodating said normally open electromagnet valve to thereby limit a travel distance of said piston.

2. A one-time bleed valve assembly system for an anti-lock brake system, comprising:

hydraulic control unit having a body accommodating a low-pressure line and a primary hydraulic pressure circuit connecting a tandem master cylinder to a wheel brake caliper by way of a normally open electromagnet valve mounted in a recessed part of said body, wherein said bleed valve includes a piston adapted to be sealingly installed into a bore made in said body, wherein said bore is sized to create a seal when said piston is pushed into said bore in response to a brake pressure, wherein said bore is in communication on one end thereof with said primary hydraulic pressure circuit and in communication on another end thereof with said low-pressure line, whereby when said piston sits loosely in said bore, an air communication is established between said primary hydraulic pressure circuit and said low-pressure line thus allowing air evacuation from said low-pressure line on exposure to a vacuum applied to said primary hydraulic pressure circuit further comprising an access hole between the outside of said body and said bore, said hole being provided with an expansion in an area thereof adjoining the outside, said expansion accommodating a seal ball, wherein said bore is made in a portion of said body located immediately under said recessed part accommodating said normally open electromagnet valve to thereby limit a travel distance of said piston.

3. The one-time bleed valve as claimed in claim 1, further comprising an O-ring fitted on an annular groove made on a head portion of said piston.

4. The one-time bleed valve as claimed in claim 1, wherein said bore is made with a lead-in chamfer to facilitate pushing said piston therein.

5. A hydraulic brake system for vehicle wheels in a multiple-brake-circuit design, said system comprising a master brake cylinder, hydraulic control unit, wheel brakes and a plurality of brake circuits, each circuit of said plurality of brake circuits comprising a primary hydraulic pressure circuit and a secondary hydraulic pressure circuit, said primary hydraulic pressure circuit connecting said master cylinder with at least one wheel brake of said wheel brakes for applying hydraulic pressure thereto via a normally open electromagnet valve in said hydraulic control unit, said secondary hydraulic pressure circuit returning hydraulic pressure from said at least one wheel brake to said master cylinder via a normally closed electromagnet valve in said hydraulic control unit, said secondary hydraulic pressure circuit comprising a low-pressure line, said hydraulic control unit including a body accommodating said primary hydraulic pressure circuit, said normally open electromagnet valve, and said low-pressure line, wherein a bleed valve is provided in said each circuit of said plurality of brake circuits to connect said primary hydraulic pressure circuit and said low-pressure line, said bleed valve comprising a piston adapted to be sealingly installed into a bore made in said body, said bore being sized to create a seal when said piston is pushed into said bore in response to a brake pressure, said bore being in communication on one end thereof with said primary hydraulic pressure circuit and in communication on another end thereof with said low-pressure line, whereby when said piston sits loosely in said bore, an air communication is established between said primary hydraulic pressure circuit and said low-pressure line thus allowing air evacuation from said low-pressure line on exposure to a vacuum applied to said primary hydraulic pressure circuit wherein said bore is made in a portion of said body located immediately under a recessed part thereof accommodating said normally open electromagnet valve to thereby limit a travel distance of said piston.

6. The hydraulic brake system as claimed in claim 5, wherein said piston comprises an O-ring fitted on an annular groove made on a head portion of said piston.

7. The hydraulic brake system as claimed in claim 5, wherein said bore is made with a lead-in chamfer to facilitate pushing said piston therein.

8. The hydraulic brake system as claimed in claim 5, further comprising an access hole between outside of said body and said bore, said hole being provided with an expansion in an area thereof adjoining the outside, said expansion accommodating a seal ball.

* * * * *